United States Patent Office

3,592,924
Patented July 13, 1971

3,592,924
METHOD FOR COMBATING MICRO-ORGANISMS
Arleen C. Pierce, New Brunswick, N.J., assignor to Allied Chemical Corporation, New York, N.Y.
No Drawing. Filed Oct. 21, 1966, Ser. No. 588,319
Int. Cl. A01n *9/00, 9/24*
U.S. Cl. 424—342
15 Claims

ABSTRACT OF THE DISCLOSURE

Compositions comprising ethynyl compounds of the formula:

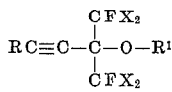

wherein R is H or Cl; $R^1$ is H or alkyl having from 1–5 carbon atoms inclusive and X is independently selected from the group consisting of H, F and Cl, are effective in combating micro-organisms.

---

This invention relates to a method for combating micro-organisms, especially bacteria, and, in a preferred embodiment relates to a method of combating micro-organisms by treating them with a chemical agent in vapor phase.

The problem of combating micro-organisms, meaning in the context of this discussion killing and preventing or retarding the propagation of micro-organisms, is common to a number of industries such as the food, agricultural and pharmaceutical industries, and is particularly significant to the medical profession. The usual methods of sterilization such as steam, heat, chemical solution, radiation, and the like, are impractical when large areas such as hospital rooms, laboratories and animal quarters are desired to be sterilized or when it is desired to sterilize delicate laboratory and medical equipment, which may contain plastics, fabrics, and the like, that may be adversely affected by moisture and heat.

The term sterilization is generally interpreted as referring to a condition in which a body or locus is freed from all living micro-organisms as opposed to being freed only from certain mirco-organisms.

The problem of freeing a body from all living micro-organisms is no mean one because, although many varieties of micro-organisms are relatively easy to combat, others have particularly high resistances to adverse conditions and are exceedingly difficult to combat. Such a micro-organism is the bacteria *Staphylococcus aureus*. Unfortunately, such bacteria are commonly found in hospitals and food and are responsible for a large number of human fatalities every year. Because *Staphylococcus aureus* cells are so difficult to combat in comparison with other micro-organisms, researchers have used these cells as standards for sterilization tests. It is presumed that, if a given chemical agent is effective in combating *Staphylococcus aureus* cells, it will be effective in combating other varieties of vegetative cells. The converse of this is, of course, not true. Experience has proved this to be the case. An illustrative standard test that is widely used is the so-called F.D.A. Method (Food and Drug Administration Method) as published by Ruehle and Brewer in 1931. (See Porter, Bacterial Chemistry and Physiology, John Wiley & Sons, Inc., New York (1946), p. 226.) This method requires tests of disinfectant or antiseptic action to be carried out against strains of *Staphylococcus aureus*.

The problem of sterilizing large areas and of sterilizing heat- or water-sensitive materials has been alleviated by the use of antimicrobic agents in vapor phase. Effective vapor phase antimicrobic agents must be capable of being readily introduced into the vicinity of the area to be treated; of rapidly and thoroughly penetrating porous surfaces in the area; of effectively penetrating, while in vapor phase, the micro-organisms to be treated; of destroying the micro-organisms over a wide range of temperatures and humidities; and of permitting ready removal by aeration. Unfortunately, many chemical agents, while possessing good antimicrobic activity, are not capable of functioning effectively in vapor phase for lack of one or more of the above-noted requirements. Bactericidal agents, for example, which have high vapor pressures and may be vaporized easily, may still not possess the penetrability properties required for effective vapor phase use.

It is a major object of this invention to provide a novel method for combating micro-organisms such as bacteria, fungi and the like.

It is another object of the invention to provide a novel method for effectively combating micro-organisms such as bacteria, fungi and the like over a wide range of relative humidity conditions.

Yet another object of the invention is to provide a novel sterilization method.

It is a more particular object of the invention to provide a novel method for combating bacteria.

A still more specific object of the invention is to provide a novel method for combating *Staphylococcus aureus* cells.

A preferred object of the invention is to provide a novel method for combating micro-organisms, particularly bacteria, comprising treating them with a chemical agent in vapor phase.

The preferred, most specific object of the invention is to provide a novel method for combating *Staphylococcus aureus* cells by treating them with a chemical agent in vapor phase.

It has been found that the above stated objects of the invention are accomplished by treating micro-organisms, particularly *Staphylococcus aureus* cells with ethynyl halodimethyl carbinol or ether derivatives of the formula:

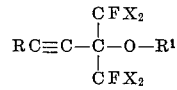

wherein R is H or Cl; $R^1$ is H or an alkyl radical having from 1–5 carbon atoms inclusive and X is independently selected from the group consisting of H, F and Cl. In the above formula the X atoms may be the same or different and $R^1$, when an alkyl radical, may be straight chain or branched. A preferred subclass of compounds, as described above, are those in which all the X atoms are fluorine. Such compounds have been found to exhibit extremely high activity at both high and low relative humidities. The novel antimicrobic agents of the invention will be referred to hereafter as "the subject ethynyl compounds." In accordance with the preferred objects of the invention, the subject ethynyl compounds may be used effectively in vapor phase.

The subject ethynyl compounds wherein, in the above given formula, R is H and R¹ is H, may be prepared as described substantially in copending application of Robert E. A. Dear and Everett E. Gilbert, Ser. No. 550,113, filed May 16, 1966, entitled "Process for Controlling Nematodes with Fluorinated Alcohols," now abandoned. The process described in this application comprises essentially reacting an acetylenic Grignard reagent with a fluoroacetone of the formula

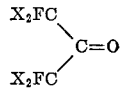

wherein X is as defined above, in a tetrahydrofuran solution, followed by hydrolysis of the reaction product thereby obtained to the corresponding ethynyl halodimethyl carbinol. The sought-for carbinol may be recovered from the reaction mixture by distillation from concentrated $H_2SO_4$.

The subject ethynyl compounds wherein, in the above given formula, R is Cl and R¹ is H, may be prepared as described substantially in copending application Ser. No. 550,113 mentioned supra, which process comprises essentially reacting lithium ethynyl chloride with a fluoroacetone of the formula:

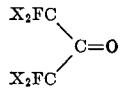

wherein X is as defined above, in ether solution, followed by hydrolysis of the product to the corresponding chloroethynyl halodimethyl carbinol. The sought-for carbinol may be recovered from the reaction mixture by distillation from concentrated $H_2SO_4$.

The subject ethynyl compounds wherein, in the above given formula, R¹ is an alkyl radical having from 1–5 carbon atoms, may be prepared by alkylation of a subject ethynyl or chloroethynyl halodimethyl carbinol such as by reacting an alkali metal salt of an appropriate carbinol with an alkyl donor, such as dimethyl sulfate, at a temperature from about −5° C. up to about 100° C. The resulting volatile ether may be recovered by distillation from the aqueous mixture.

Illustrative of the ethynyl compounds within the scope of the invention are the following:

Ethynyl halodimethyl carbinols 1,1,1-trifluoro-2-(trifluoromethyl)-3-butyn-2-ol
1,1,1-trifluoro-2-(chlorodifluoromethyl)-3-butyn-2-ol
1,1,1-trifluoro-2-(difluoromethyl)-3-butyn-2-ol
1,1-difluoro-2-(difluoromethyl)-3-butyn-2-ol
1,1,1-chlorodifluoro-2-(chlorodifluoromethyl)-3-butyn-2-ol
1-fluoro-2-(fluoromethyl)-3-butyn-2-ol
1,1,1-chlorodifluoro-2-(difluoromethyl)-3-butyn-2-ol Chloroethynyl halodimethyl carbinols 1,1,1-trifluoro-2-(trifluoromethyl)-4-chloro-3-butyn-2-ol
1,1,1-trifluoro-2-(chlorodifluoromethyl)-4-chloro-3-butyn-2-ol
1,1,1-trifluoro-2-(difluoromethyl)-4-chloro-3-butyn-2-ol
1,1-difluoro-2-(difluoromethyl)-4-chloro-3-butyn-2-ol
1,1,1-chlorodifluoro-2-(chlorodifluoromethyl)-4-chloro-3-butyn-2-ol
1-fluoro-2-(fluoromethyl)-4-chloro-3-butyn-2-ol
1,1,1-chlorodifluoro-2-(difluoromethyl)-4-chloro-3-butyn-2-ol Ethynyl halodimethyl ethers 1,1,1-trifluoro-2-(trifluoromethyl)-2-methoxy-3-butyne
1,1,1-trifluoro-2-(chlorodifluoromethyl)-2-methoxy-3-butyne
1,1,1-chlorodifluoro-2-(difluoromethyl)-2-ethoxy-3-butyne
1,1,1-trifluoro-2-(trifluoromethyl)-2-pentoxy-3-butyne
1,1,1-trifluoro-2-(difluoromethyl)-2-propoxy-3-butyne
1,1-difluoro-2-(difluoromethyl)-2-butoxy-3-butyne
1,1,1-chlorodifluoromethyl-2-(chlorodifluoromethyl)-2-ethoxy-3-butyne Chloroethynyl halodimethyl ethers 1,1,1-trifluoro-2-(trifluoromethyl)-2-methoxy-4-chloro-3-butyne
1,1,1-trifluoro-2-(chlorodifluoromethyl)-2-methoxy-4-chloro-3-butyne
1,1,1-chlorodifluoro-2-(difluoromethyl)-2-ethoxy-4-chloro-3-butyne
1,1,1-trifluoro-2-(trifluoromethyl)-2-pentoxy-4-chloro-3-butyne
1,1,1-trifluoro-2-(difluoromethyl)-2-isopropoxy-4-chloro-3-butyne
1,1-difluoro-2-(difluoromethyl)-2-butoxy-4-chloro-3-butyne
1,1,1-chlorodifluoromethyl-2-(chlorodifluoromethyl)-2-ethoxy-4-chloro-3-butyne The subject ethynyl compounds may be used to treat micro-organisms by contacting the micro-organisms to be treated, or surfaces containing the same, with the subject ethynyl compounds in the form of solutions, sprays, mists, dusts, or in accordance with the preferred embodiment, in vaporous state. The subject ethynyl compounds may be used alone or in admixture with vaporous, solid or liquid diluents such as air and water or hydrocarbon liquids, with or without any of the well-known anionic, cationic or nonionic surface-active wetting agents. Such agents include, for example, alkali metal salts of higher fatty acids, water-soluble salts of sulfated higher fatty alcohols, water-soluble aryl sulfonates, and quaternary ammonium bases such as trialkyl benzyl ammonium chloride. In the preferred vapor phase embodiment, a subject ethynyl compound may be conveniently employed such as by vaporizing it in a closed area in which the micro-organism-containing surfaces to be treated are located or by using a vaporous diluent such as air which may be bubbled into the liquid ethynyl compound and then the ethynyl compound-laden air used to fumigate a closed space surrounding the micro-organism-containing surfaces to be treated.

As is well known in this art, dosages of a given antimicrobic agent can vary widely depending upon the particular organism to be controlled, the area of the locus to be treated, the time in which control is desired to be established, and environmental conditions such as temperature, relative humidity, etc. In any event, sufficient concentrations of the subject ethynyl compounds should be utilized in order to effectively combat the micro-organisms to be treated, that is to say, in order to maximize the killing of existing living bacteria and the prevention of propagation of the same in the same locus for a significant period of time. The dosages that will be required in a particular case to accomplish these ends are readily ascertainable and are thus within the skill of the art.

The subject ethynyl compounds can be employed as the sole active ingredient in combating micro-organisms; however, if desired, they can be combined with active materials such as other antimicrobic agents or growth inhibitors to achieve special results or with nonactive components such as perfumes, propellant aids, and the like.

EXAMPLES 1–8

One-tenth ml. portions of ethynyl compound test materials were charged to one-liter flasks. Circular patches of cotton cloth, each having an area of about 2 cm.² and each impregnated with an aqueous suspension of about 5×10⁶ *Staphylococcus aureus* cells and subsequently dried, were suspended by wires about halfway down into the flasks. The flasks were stoppered and the patches containing the bacteria were exposed to the subject ethynyl compound vapor for varying periods of 1, 4 and 24 hours. The exposures were conducted at room temperature (about 20–31° C.) and were duplicated in atmospheres of 90% and 50 or 73% relative humidity. Relative humidities in the bottles were elevated by flushing with air passed through water. At the end of the exposure periods, the patches were removed and assayed for viable organisms by the pour-plate method as follows: The patches were placed in dilution blanks composed of aqueous solutions of 0.1% lecithin v./v. and 0.71% Tween 80 (trademark of Atlas Powder Co. for an emulsifier comprising a polyoxyalkylene derivative of sorbitan monooleate) v./v. and adjusted to pH 7 with 1 N NaOH. Organisms remaining on the patches were dislodged by shaking and aliquots were plated in enrich nutrient agar. After incubating for 48 hours at 37° C., the percentage of organisms killed (attributable to the action of the subject ethynyl compound test material) was calculated by comparison of the number found after testing with an assay of unexposed contaminant patches. Bacteria counts were made with a Quebec Colony counter. Average results of the above described tests are shown in the following table.

| Ex. | Test compound | Relative humidity | Percent of bacteria cells killed in— | | |
|---|---|---|---|---|---|
| | | | 1 hr. | 4 hrs. | 24 hrs. |
| 1 | 1,1,1-trifluoro-2-(chlorodifluoromethyl)-3-butyn-2-ol. | 50 | 99 | 100 | |
| 2 | do | 90 | 99 | 100 | |
| 3 | 1,1,1-trifluoro-2-(chlorodifluoromethyl)-2-methoxy-3-butyne. | 50 | | 100 | |
| 4 | do | 90 | | 100 | |
| 5 | 1,1-difluoro-2-(difluoromethyl)-3-butyn-2-ol. | 50 | | | 100 |
| 6 | do | 90 | | | 100 |
| 7 | 1,1,1-trifluoro-2-(trifluoromethyl)-4-chloro-3-butyn-2-ol. | 73 | 100 | | |
| 8 | do | 90 | 100 | | |

I claim:
1. The method of combating bacteria and fungi which comprises treating said micro-organisms with a bactericidally and fungicidally effective amount of an ethynyl compound of the formula

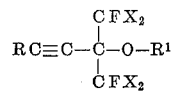

wherein R is H or Cl; R¹ is H or alkyl having from 1–5 carbon atoms inclusive and X is independently selected from the group consisting of H, F and Cl.

2. The method of claim 1 in which R is H.
3. The method of claim 1 in which R is Cl.
4. The method of claim 1 in which R¹ is H.
5. The method of claim 1 in which R¹ is alkyl containing from 1–5 carbon atoms inclusive.
6. The method of claim 1 in which all the X atoms are fluorine.
7. The method of claim 1 in which all the X atoms are fluorine, in which R is H and in which R¹ is H.
8. The method of claim 1 in which all the X atoms are fluorine, in which R is Cl and in which R¹ is H.
9. The method of claim 1 in which the ethynyl compounds are employed in vapor phase.
10. The method of claim 1 in which the micro-organisms treated are bacteria.
11. The method of claim 1 in which the micro-organisms treated are *Staphylococcus aureus* cells.
12. The method of claim 1 in which the ethynyl compound is 1,1,1-trifluoro-2-(chlorodifluoromethyl)-3-butyn-2-ol.
13. The method of claim 1 in which the ethynyl compound is 1,1,1-trifluoro-2-(chlorodifluoromethyl)-2-methoxy-3-butyne.
14. The method of claim 1 in which the ethynyl compound is 1,1-difluoro-2-(difluoromethyl)-3-butyn-2-ol.
15. The method of claim 1 in which the ethynyl compound is 1,1,1 - trifluoro-2-(trifluoromethyl)-4-chloro-3-butyn-2-ol.

References Cited
UNITED STATES PATENTS
| | | | |
|---|---|---|---|
| 3,450,773 | 6/1969 | Dear et al. | 260—614 |
| 2,836,536 | 5/1958 | Meuli | 167—22 |
| 3,129,053 | 4/1964 | Castle | 8—93 |
| 3,189,621 | 6/1965 | Harnik | 260—397.4 |
| 3,227,674 | 1/1966 | Middleton | 260—33.4 |

OTHER REFERENCES
The American College Dictionary (1965), p. 592.

STANLEY J. FRIEDMAN, Primary Examiner

A. J. ROBINSON, Assistant Examiner

U.S. Cl. X.R.

424—343